J. L. BAUDELOT.
Beer Cooler.
No. 1,267. Reissued Jan'y 28, 1862.
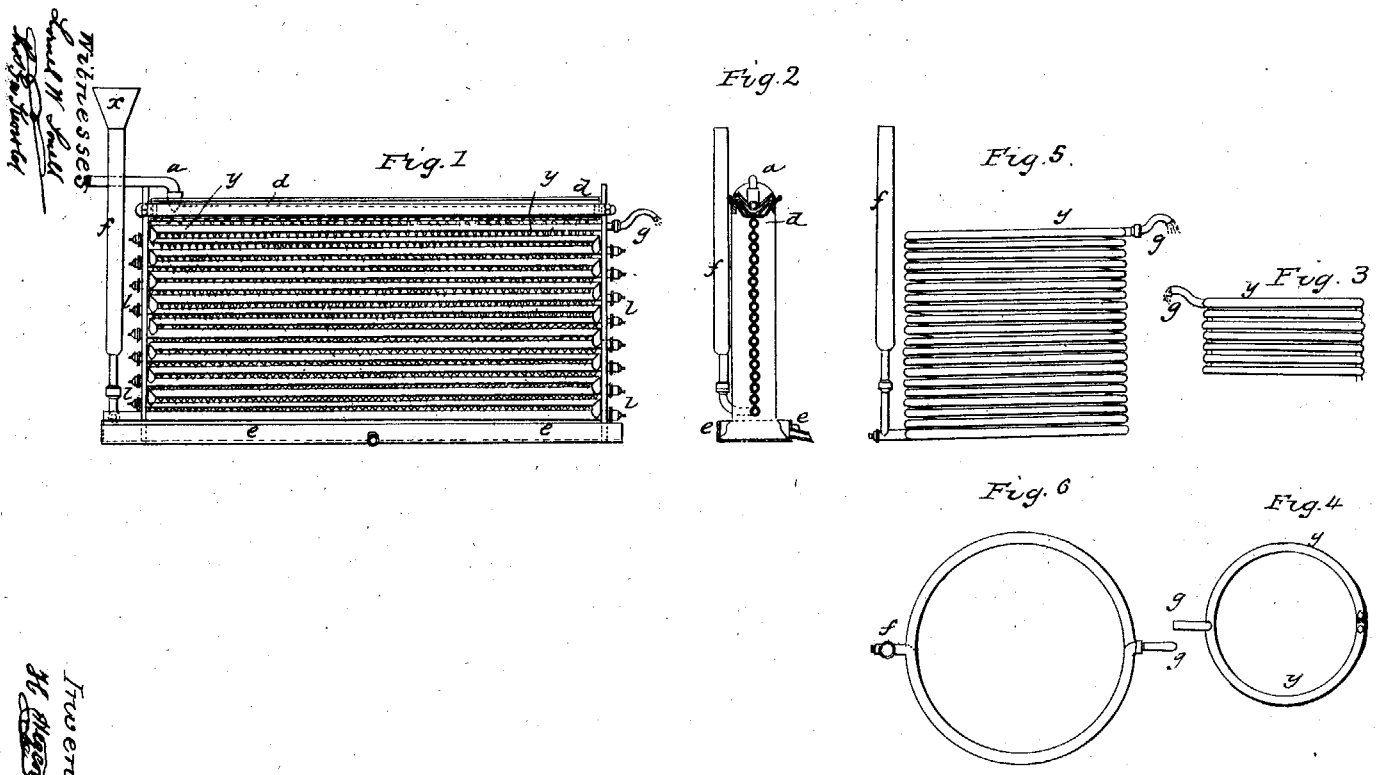
N. PETERS, Photo-Lithographer, Washington, D.C.

UNITED STATES PATENT OFFICE.

HENRY MIGEON, OF WOLCOTTVILLE, CONNECTICUT, ASSIGNEE OF JEAN LOUIS BAUDELOT, OF HARANCOURT, FRANCE.

IMPROVED APPARATUS FOR COOLING BEER AND OTHER LIQUIDS.

Specification forming part of Letters Patent No. 25,992, dated November 1, 1859; antedated April 13, 1856; Reissue No. 1,267, dated January 28, 1862.

*To all whom it may concern:*

Be it known that I, HENRY MIGEON, of Wolcottville, in the county of Litchfield and State of Connecticut, do hereby declare the following to be a full, clear, and exact description of an Improved Means for Cooling Beer and other Liquids, invented by JEAN LOUIS BAUDELOT, of Harancourt, in the Empire of France, and of whom I am assignee.

The nature of the said invention is fully set forth in the following specification, reference being had to the annexed drawings, making part of this specification, wherein—

Figure 1 is a side elevation of the said apparatus. Fig. 2 is a cross-section of the same. Fig. 3 is a side view, and Fig. 4 is a plan showing a circular range of pipes that may be substituted for the flat range shown in Figs. 1 and 2. Figs. 5 and 6 represent a pipe in a coiled or helical form for the same purpose.

Similar marks of reference denote the same parts.

The said cooler or refrigerator consists in a set of tubes placed horizontally one above another to the number of seventeen, and connected and communicating with each other at their alternate ends, as shown by Fig. 1; but said invention is not limited by any number of tubes, nor by their length, size, or diameter, nor by any particular mode or manner of construction of the said refrigerator, as the same may be made or constructed of any size or form according to requirements and yet produce the same effect.

The said invention consists in speedily cooling beer or any other liquid nearly to the degree of the cooling water used at any season of the year by forcing cold water to run up from the bottom to the top in the inside of the tubes, and the hot beer or liquid falling on the exterior surface from the top to the bottom, or by the same apparatus, with the water and beer or other liquid transposed in position.

The said cooler or refrigerator when made is placed in an upright position, and can be formed of either copper, zinc, or any other suitable metal. The said tubes are superposed or placed over each other at about a quarter of an inch apart, while each tube is provided with a plug, *l*, at each end, which may be taken out for the purpose of cleaning the inside. At the under side of each tube, in the center and over its entire length, is soldered a thin blade of metal. The said blade is notched or made in the form of saw-teeth, (see Fig. 1,) so as to serve as a conductor for the liquid falling successively from one tube to the other. From the kettle or boiler, or from any other vessel, the said beer or liquid in the hot or boiling state passes into the tube *a*. This tube, as at *b*, is provided with holes, and distributes the beer or liquid over its whole length, from whence it falls into a trough, the bottom of which is made of very fine wire-gauze *c* in order to retain the scum or loose hops, &c. This trough is situated in the interior of another trough, *d*, perforated at the bottom over its whole length, with a row of small holes near and directly over the top of the first refrigerator-tube, *y*, and the beer or other liquid divides uniformly and trickles over the exterior surface of the first tube, from whence the liquid falls on the next one, and so on, from one tube to the other down to the bottom tube, and arrives cooled into a large trough, *e*, in which stands the said refrigerator.

Connected with the lowest or bottom tube of the said refrigerator is an upright tube, *f*, or leader, a little more elevated than the said refrigerator, into which is introduced the cold water, the pressure of which forces the same to run up from tube to tube to the top and last one, whence it comes out, as shown at *g*, and will have become hot by having abstracted from the beer or other liquid the superfluous heat.

It will be apparent that the pipes shown in Figs. 3, 4, 5, and 6 may be used in connection with the distributing-pipe *a b* and trough *d* when made in a circular form to correspond, although the apparatus shown in Figs. 1 and 2 is preferred.

From the foregoing it will be seen that a very thin stratum of beer or other liquid is trickling or running over the surface of the pipes and dripping from one to the other, thereby exposing a large area for the vapors to pass away as the cooling progresses; and this, in conjunction with the speed of the cooling operation, renders the quality of the beer when cooled on such apparatus far superior to that cooled by any previous apparatus. It will also be evident that in this apparatus the peculiar advantage is gained over others heretofore used that the circulation of the water when heated is avoided; or, in other words, that the beer or other liquid falling on the upper pipes in a hot state trickles down over a surface that finally is cold, and from that the liquid passes away, (and the same effect is produced when the beer or other liquid is within the pipes and the water trickling over,) whereas in other instances the circulation induced in a mass of liquid that has heretofore surrounded said pipes has prevented the perfect transfer of the heat from the liquid to be cooled to the cooling liquid.

Having thus described the said invention, no claim is made to a worm or pipe into which the water passes at the bottom and escapes at the top when such pipes are immersed in a vat or tun containing liquid to be cooled; neither is any claim made to passing the cooling water in the opposite direction to the beer when the latter runs in channels or on an inclined surface; and the said apparatus employed as a cooler causes the heat of the liquid to be cooled to be received and conveyed away by the cooling liquid, while the liquid to be cooled passes off at the temperature or nearly so of the cooling liquid, and hence is to be distinguished from a range of pipes employed for the purpose of condensing or evaporating.

What is claimed as the invention of the said JEAN LOUIS BAUDELOT is—

A cooling apparatus for liquids composed of a vertical range of pipes, passing one liquid successively from the lower to the upper pipes in said range, in combination with the perforated trough *d* or its equivalent, supplying the other liquid, which trickles over the surface of said range of pipes, as set forth.

Dated this 10th day of January, 1862.

H. MIGEON,
*Assignee of Jean Louis Baudelot.*

Witnesses:
LEMUEL W. SERRELL,
THOS. GEO. HAROLD.